United States Patent
Saruwatari et al.

(12) 
(10) Patent No.: US 7,718,580 B2
(45) Date of Patent: May 18, 2010

(54) INTERNAL-OLEFIN COMPOSITION AND BASE OIL COMPRISING THE COMPOSITION FOR OIL DRILLING

(75) Inventors: Tetsuya Saruwatari, Chiba (JP); Nobuo Fujikawa, Chiba (JP); Hideki Yamane, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 164 days.

(21) Appl. No.: 11/574,558

(22) PCT Filed: Sep. 2, 2005

(86) PCT No.: PCT/JP2005/016102

§ 371 (c)(1), (2), (4) Date: Mar. 1, 2007

(87) PCT Pub. No.: WO2006/025521

PCT Pub. Date: Mar. 9, 2006

(65) Prior Publication Data

US 2007/0270315 A1   Nov. 22, 2007

(30) Foreign Application Priority Data

Sep. 3, 2004   (JP) .............................. 2004-257386

(51) Int. Cl.
*C09K 8/02* (2006.01)
(52) U.S. Cl. ..................... 507/103; 507/905; 166/305.1
(58) Field of Classification Search ................. 507/103, 507/905; 166/305.1
See application file for complete search history.

(56) References Cited

U.S. PATENT DOCUMENTS

| | | | |
|---|---|---|---|
| 6,323,157 B1 * | 11/2001 | Carpenter et al. | ........... 507/103 |
| 6,514,915 B1 | 2/2003 | Beyer et al. | |
| 2005/0054539 A1 | 3/2005 | Patel et al. | |

FOREIGN PATENT DOCUMENTS

| JP | 6-57684 | 3/1994 |
|---|---|---|
| JP | 2001-140190 | 5/2001 |
| WO | 90/03354 | 4/1990 |
| WO | 00/03961 | 1/2000 |
| WO | 03/101920 | 12/2003 |
| WO | 2004/029175 | 4/2004 |

OTHER PUBLICATIONS

U.S. Appl. No. 11/813,727, filed Jul. 11, 2007, Saruwatari, et al.

* cited by examiner

*Primary Examiner*—Timothy J. Kugel
*Assistant Examiner*—Atnaf Admasu
(74) *Attorney, Agent, or Firm*—Oblon, Spivak, McClelland, Maier & Neustadt, L.L.P.

(57) ABSTRACT

The present invention provides an internal olefin composition comprising a mixture of 60 to 80% by mass of an olefin having 16 carbon atoms and 40 to 20% by mass of an olefin having 18 carbon atoms wherein a content of an α-olefin in the mixture is 10% by mass or less, and a content of a branched olefin in the mixture is 10% by mass or less, which has a good biodegradability even when discharged into the environments, a less toxicity against marine organisms, etc., and a sufficient fluidity when used as a base oil for oil drilling, etc.

9 Claims, No Drawings

INTERNAL-OLEFIN COMPOSITION AND BASE OIL COMPRISING THE COMPOSITION FOR OIL DRILLING

TECHNICAL FIELD

The present invention relates to internal olefin compositions comprising a mixture of 60 to 80% by mass of an olefin having 16 carbon atoms and 40 to 20% by mass of an olefin having 18 carbon atoms, wherein a content of an α-olefin in the mixture is 10% by mass or less, and a content of a branched olefin in the mixture is 10% by mass or less; and base oils for oil drilling containing the composition.

BACKGROUND ART

Internal olefins have been conventionally used in various applications specifically such as base oils for oil drilling, raw materials for detergents, raw materials for sizing agents for papers, base oils or raw materials for lubricants and raw materials for chemical products.

The internal olefins used in these applications have been required to satisfy the following requirements.

For example, in the applications of base oils for oil drilling, the internal olefins having 16 and 18 carbon atoms are generally used. The internal olefins used in such applications have been required to exhibit well-controlled pour point and kinematic viscosity as well as a high biodegradability.

As the method for production of such internal olefins, there are known techniques for internal isomerization of α-olefins using a catalyst formed by supporting Pt, Ru, Ni, etc., on a carrier such as alumina and zeolite, or ferrierite as one of zeolites. These techniques have been already industrially put into practice.

In general, the internal olefins are converted into tri-substituted or tetra-substituted branched olefins when subjected to skeletal isomerization reaction. It is known that these branched olefins not only exhibit a change in properties such as drop of pour point but also are deteriorated in biodegradability in natural environments as compared to the original olefins.

In various applications of the internal olefins as described above, the drop of a pour point thereof is preferable, in particular, when used in the applications of base oils for oil drilling. On the other hand, the raw materials exhibiting a poor biodegradability are presently actually unusable in the applications having a high possibility of discharging the materials into the natural environments such as detergents and base oils for oil drilling owing to recent environmental policies for prohibiting release of such materials.

Conventionally, the following patent applications relating to the method for producing olefins usable as base oils for oil drilling, have been filed.

(1) The method of isomerizing α-olefins by using a molecular sieve containing no metal belonging to Group 8 of the Periodic Table wherein the obtained reaction product contains branched olefins in an amount of 5% by mass or more, and a content of the α-olefins in the reaction product is less than 20% by mass (for example, U.S. Pat. No. 5,965,783).

(2) The method of isomerizing α-olefins by using a molecular sieve of a non-zeolite structure having an optimum pore size wherein the raw materials contain at least 50% by mass of olefins having 12 or more carbon atoms, and the obtained reaction product contains at least 5% by mass of branched olefins (for example, U.S. Pat. No. 6,054,415).

(3) The method of isomerizing α-olefins by using a pentasil zeolite modified with a Ni monoxide wherein the obtained reaction product contains at least 90% by mass of linear olefins, and a content of branched olefins therein is less than 5% by mass (for example, U.S. Pat. No. 6,054,629).

(4) The method of isomerizing α-olefins having 4 to 50 carbon atoms by using a molecular sieve containing an aluminophosphate having one-dimensional pores wherein a branching reaction of the olefins is prevented by the one-dimensional pores (for example, U.S. Pat. No. 6,281,404).

Also, the following patent applications relating to base oils for oil drilling have been conventionally filed.

(5) A base oil for oil drilling, comprising olefins having 12 or more carbon atoms which contain linear olefins in an amount of 50 to 100% by mass and α-olefins in an amount of less than 20% by mass, an additive and water (for example, U.S. Pat. No. 5,589,442).

(6) A base oil for oil drilling, comprising olefins having 12 or more carbon atoms which contain branched olefins in an amount of 15 to 90% by mass and α-olefins in an amount of less than 20% by mass, an additive and water (for example, U.S. Pat. No. 5,741,759).

(7) A base oil for oil drilling, comprising 30% by mass or more of olefins having 12 or more carbon atoms which contain linear olefins in an amount of 50 to 100% by mass and α-olefins in an amount of less than 20% by mass, an additive and water (for example, U.S. Pat. No. 6,057,272).

However, the conventional olefins used as the above base oils for oil drilling as well as those contained in the base oils for oil drilling have failed to satisfy the requirements such as a good biodegradability when discharged into the environments, a less toxicity against marine organisms, etc., and a sufficient fluidity when used as base oils for oil drilling.

Therefore, it has been demanded to provide olefins capable of satisfying the requirements such as a good biodegradability when discharged into the environments, a less toxicity against marine organisms, etc., and a sufficient fluidity when used as base oils for oil drilling.

DISCLOSURE OF THE INVENTION

The present invention has been made to solve the above problems. An object of the present invention is to provide an olefin mixture capable of satisfying the requirements such as a good biodegradability when discharged into the environments, a less toxicity against marine organisms, etc., and a sufficient fluidity when used as base oils for oil drilling.

As a result of extensive researches in view of the above problems, the inventors have found that the above object can be achieved by a mixture composed of 60 to 80% by mass of an olefin having 16 carbon atoms and 40 to 20% by mass of an olefin having 18 carbon atoms wherein a content of an α-olefin in the mixture is 10% by mass or less, and a content of a branched olefin in the mixture is 10% by mass or less. The present invention has been accomplished on the basis of the above finding.

Thus, the present invention relates to:

1. An internal olefin composition comprising a mixture of 60 to 80% by mass of an olefin having 16 carbon atoms and 40 to 20% by mass of an olefin having 18 carbon atoms, wherein a content of an α-olefin in the mixture is 10% by mass or less, and a content of a branched olefin in the mixture is 10% by mass or less;

2. the internal olefin composition as described in the above aspect 1, wherein a content of hydrocarbons having 20 or more carbon atoms (heavy components) in the composition is 3% by mass or less;

3. the internal olefin composition as described in the above aspect 1 or 2, wherein the composition is produced by isomerizing α-olefins respectively having 16 and 18 carbon atoms in the presence of a zeolite- and/or montmorillonite-based catalyst;

4. a base oil for oil drilling, comprising the internal olefin composition as described in any one of the above aspects 1 to 3; and 5. a cutting oil for cutting a submarine base rock, comprising the internal olefin composition as described in any one of the above aspects 1 to 3.

The internal olefin composition of the present invention is a mixture composed of 60 to 80% by mass of an olefin having 16 carbon atoms and 40 to 20% by mass of an olefin having 18 carbon atoms, wherein a content of an α-olefin in the mixture is 10% by mass or less, and a content of a branched olefin in the mixture is 10% by mass or less, and exhibits a good biodegradability when discharged into the environments, a less toxicity against marine organisms, etc., and a sufficient fluidity when used as base oils for oil drilling, etc.

The α-olefins used as raw materials for production of the internal olefin composition of the present invention, are usually in the form of a mixture containing 60 to 80% by mass of an α-olefin having 16 carbon atoms and 40 to 20% by mass of an α-olefin having 18 carbon atoms, preferably a mixture containing 65 to 80% by mass of an α-olefin having 16 carbon atoms and 20 to 35% by mass of an α-olefin having 18 carbon atoms, and more preferably a mixture containing 70 to 80% by mass of an α-olefin having 16 carbon atoms and 20 to 30% by mass of an α-olefin having 18 carbon atoms.

When the contents of the α-olefin having 16 carbon atoms and the α-olefin having 18 carbon atoms lie within the above-specified ranges, the resultant internal olefin composition can exhibit excellent fluidity and environmental characteristics.

The mixture of the α-olefins respectively having 16 and 18 carbon atoms is preferably produced by subjecting an oligomer obtained by oligomerizing ethylene in the presence of a Ziegler type catalyst to distillation.

Examples of the oligomer of ethylene include 1-butene, 1-hexene, 1-octene, 1-decene, 1-dodecene, 1-tetradecene, 1-hexadecene, 1-octadecene and 1-eicosene.

In addition, the α-olefins used as the raw materials in the present invention may also be produced by subjecting α-olefins obtained from a catalytic cracking apparatus to distillation.

In the present invention, the concentration of oxo compounds contained in the α-olefins is preferably 15 ppm by mass or less and more preferably 10 ppm by mass or less in terms of oxygen.

When the concentration of oxo compounds contained in the α-olefins in terms of oxygen is 15 ppm by mass or less, the internal olefins obtained by isomerization reaction of the α-olefins can be highly enhanced in properties such as isomerization conversion rate and linear chain ratio, and further the isomerization reaction can be conducted even at a low temperature.

The above "oxo compounds" used herein mean peroxides, etc., which are contained in the α-olefins, and the concentration of the oxo compounds in terms of oxygen means a concentration of oxygen contained in molecules of the oxo compounds.

The oxo compounds may be removed from the α-olefins, for example, by passing the raw α-olefins through a column filled with an activated alumina.

Also, the concentration of the oxo compounds in the α-olefins in terms of oxygen may be determined by the method of mixing a sample to be measured with a ferrous ion-containing solution, treating the obtained mixture with a peroxide to produce a ferric ion, and then subjecting the thus produced ferric ion to titration using a titanium trichloride solution, or the like.

In the present invention, the content of water in the α-olefin is preferably 5 ppm by mass or less.

When the water content in the α-olefins is 5 ppm by mass or less, the catalyst used in the isomerization reaction can maintain its catalytic activity for a long period of time.

In the present invention, the water content in the α-olefins may be measured by a Karl-Fischer testing method according to JIS K-2275.

The dehydration method for removing water from the α-olefins is not particularly limited. The removal of water from the α-olefin may be conducted, for example, by having the α-olefins flow through a dehydration column filled with a drying agent, or by subjecting the α-olefins to distillation before the reaction.

The dehydration column may be usually of a fixed bed type, and as the drying agent, there may be used those prepared by drying a molecular sieve 3 A, 4 A or 5 A, an activated alumina, anhydrous silica gel, etc., at a temperature of 200 to 500° C.

The dehydration column may be operated at room temperature, and the pressure, flow rate, etc., used therein may be determined depending upon the isomerization reaction conditions.

Examples of the catalyst used in the present invention include zeolite catalysts and montmorillonite catalysts.

Examples of the zeolite catalysts include natural zeolites and synthetic zeolites.

Specific examples of the natural zeolites include chabazite, mordenite, erionite, faujasite and clinoptilolite.

Specific examples of the synthetic zeolites include A-type zeolites, B-type zeolites, X-type zeolites, Y-type zeolites, L-type zeolites, Omega-type zeolites and MFI-type zeolites.

Among these synthetic zeolites, preferred are MFI-type zeolites, and more preferred are ZSM-5, etc.

In the present invention, these zeolite catalysts may be used directly, or may be subjected, if required, to various treatments such as an acid treatment, an ammonium ion treatment and an ion exchange treatment in order to control acidity thereof.

In particular, proton-type zeolites formed by substituting a part or whole of cations contained in zeolites with protons are preferred. Among these proton-type zeolites, more preferred is proton-substituted H-ZSM-5.

Examples of the montmorillonite catalysts include minerals classified into smectites such as montmorillonite, nontronite, beidellite, hectorite and saponite. Among these montmorillonite catalysts, montmorillonite is preferred in view of a good catalytic activity, etc.

In the present invention, these montmorillonite catalysts may be used directly, or may be subjected, if required, to various treatments such as an acid treatment, a halogenation treatment and a cation exchange treatment in order to control acidity thereof.

The acid treatment may be performed, for example, by the method of dispersing the montmorillonite catalyst in an aqueous solution containing an inorganic acid such as hydrochloric acid, sulfuric acid and phosphoric acid or an organic solvent such as alcohol, and then, if required, after heating, subjecting the obtained dispersion to filtration and drying, followed, if required, by calcination treatment.

Also, the halogenation treatment may be performed, for example, by the method of dispersing the montmorillonite catalyst in an aqueous solution containing a halogen compound such as ammonium fluoride, aluminum fluoride and aluminum chloride, and then, if required, after heating, subjecting the obtained dispersion to filtration and drying, followed, if required, by calcination treatment, or by the method of filling the montmorillonite catalyst in a reaction tube, and then flowing fluorohydrocarbons through the reaction tube at about 500° C.

Further, the cation exchange treatment may be performed, for example, by the method of dispersing the montmorillonite catalyst in an aqueous solution containing various metal salts, and then subjecting the obtained dispersion to cation exchange treatment, followed by filtration, washing with water, etc.

The zeolite and/or montmorillonite catalysts used in the present invention may be employed after pre-treating the catalysts with air or nitrogen at a temperature of about 100 to 500° C. without the calcination treatment for activating the catalysts.

In the present invention, the thus produced catalyst is contacted with a mixture of the α-olefins respectively having 16 and 18 carbon atoms to subject the α-olefins to isomerization reaction, thereby producing internal olefins.

In general, when the internal isomerization reaction is conducted at a low temperature, although a conversion rate of the α-olefins is low, reactions thereof such as skeletal isomerization reaction tend to hardly occur, so that the obtained reaction product is mainly composed of such olefins whose double bond is shifted to the β- or γ-position.

On the other hand, in general, when the internal isomerization reaction is conducted at a high temperature, with the increase in a conversion rate of the α-olefins, a selectivity of the aimed product is lowered owing to occurrence of side reactions such as skeletal isomerization reaction and heavy component-forming reaction, thereby promoting production of such olefins whose double bond is shifted to the δ- or inner position.

Therefore, in view of a prolonged catalyst life as well as prevention of the skeletal isomerization reaction and heavy component-forming reaction, the temperature used in the isomerization reaction is usually from 70 to 170° C., preferably from 100 to 165° C. and more preferably from 100 to 160° C.

The isomerization reaction method is not particularly limited. The isomerization reaction may be conducted by either a fixed bed flow method or a batch method (including a continuous stirred-tank reactor).

The above isomerization reaction is accompanied with no change in molecular weights of the olefins and, therefore, proceeds even under normal pressure without any problems. The reaction pressure is usually from normal pressure to about 5 MPa and preferably from normal pressure to 1 MPa.

When the reaction is conducted by a fixed bed flow method, in view of a good conversion rate of the α-olefins and a good yield of the aimed internal olefins, LHSV (liquid hourly space velocity) of the raw α-olefins is usually from 0.1 to 10 h$^1$ and preferably from 1 to 4 h$^{-1}$.

When the reaction is conducted by a batch method, the amount of the zeolite and/or montmorillonite catalysts used therein is usually from 1 to 60 parts by mass, preferably from 10 to 50 parts by mass and more preferably from 20 to 40 parts by mass on the basis of 100 parts by mass of the raw α-olefins.

In this case, the reaction time may vary depending upon the reaction temperature, the aimed conversion rate of the α-olefins or the like and, therefore, is not particularly limited. The reaction time is usually from about 30 min to about 20 h for attaining sufficient results, and preferably from 1 to 10 h.

As described above, when using the zeolite and/or montmorillonite catalysts, the raw α-olefins may be subjected to internal isomerization reaction with a good selectivity even under relatively moderate conditions.

Besides, in the reaction of the present invention, deterioration of the catalysts as well as occurrence of undesirable side reactions such as skeletal isomerization reaction and heavy component-forming reaction are effectively prevented, so that the aimed internal olefins can be produced at a high yield.

In addition, the obtained reaction product solution can be directly used as a product without any purification treatment by distillation. Therefore, in the present invention, no apparatuses for removal of heavy products due to the heavy component-forming reaction, such as a distillation column, are required, thereby providing a highly economical process.

Also, since the zeolite and/or montmorillonite catalysts used in the present invention are generally inexpensive, even if replacement of the catalysts is taken into consideration, it is possible to design a sufficiently economical process.

The thus produced mixed internal olefins respectively having 16 and 18 carbon atoms according to the present invention, are in the form of a mixture composed of 60 to 80% by mass of an olefin having 16 carbon atoms and 40 to 20% by mass of an olefin having 18 carbon atoms. In the internal olefin composition, the content of the α-olefins in the mixture is 10% by mass or less, and the content of the branched olefins in the mixture is 10% by mass or less, and preferably the content of hydrocarbons having 20 or more carbon atoms (heavy components) in the mixture is 3% by mass or less. The internal olefin composition of the present invention exhibits a high linear chain ratio and is well-controlled in double bond distribution and, therefore, can be suitably used as a base oil for oil drilling, in particular, a cutting oil for cutting a submarine base rock.

EXAMPLES

The present invention will be described in more detail below with reference to the following examples and comparative examples. However, these examples are only illustrative and not intended to limit the invention thereto.

Example 1

A 12 mm-diameter stainless steel reaction column (having a length of 1.1 m and an inner diameter of 10 mm) was filled with HMFI-90 (proton-type MFI zeolite catalyst) available from Sud-Chemie Inc., and a nitrogen gas was flowed therethrough at a flow rate of 100 mL/min to conduct a pretreatment of the catalyst at 200° C. for 24 h.

Next, the reaction column was cooled to 100° C., and then a mixture composed of 60% by mass of an α-olefin having 16 carbon atoms and 40% by mass of an α-olefin having 18 carbon atoms was fed in the form of an upward flow to the reaction column at a flow rate of 100 mL/h.

At this time, the concentration of oxo compounds in the α-olefins in terms of an oxygen concentration was 12 ppm by mass, and the water content therein was 5 ppm by mass.

Meanwhile, the linear chain ratio in the raw α-olefin having 16 carbon atoms (content of linear olefins) was 95%, whereas the linear chain ratio in the raw α-olefin having 18 carbon atoms was 90%.

The reaction temperature was gradually increased from initiation of feeding the α-olefin mixture, and allowed to reach 160° C. after the elapse of 350 h.

At this time, the double bond isomerization conversion rates of the raw α-olefins were 96% for the α-olefin having 16 carbon atoms and 95% for the α-olefin having 18 carbon atoms.

The thus produced internal olefin composition was composed of 60% by mass of an olefin having 16 carbon atoms and 40% by mass of an olefin having 18 carbon atoms. The linear chain ratios of the thus produced internal olefin composition were 95% for the olefin having 16 carbon atoms and 90% for the olefin having 18 carbon atoms.

In the resultant internal olefin composition, the content of the raw α-olefins is 4.4% by mass, the content of the branched olefins (skeletal isomerization reaction products) was 7.0% by mass, and the content of the heavy components (a dimerization reaction product of the α-olefins, etc.) was 1.7% by mass.

In addition, fluidity, biodegradability and toxicity to fishes (acute toxicity) of the thus produced internal olefin composition were measured.

Results of the above analysis and experiment are shown in Tables 1, 2 and 3.

Meanwhile, the thus produced internal olefin composition was analyzed and evaluated by the following methods.

[Method for Measuring Linear Chain Ratio]

The linear chain ratio was determined by subjecting a hydrogenated product of the olefin mixture to gas chromatography.

[Method for Evaluating Fluidity]

The pour point was measured according to JIS K 2269 (1987) and evaluated by the following ratings.

Good: −3° C. or lower; Poor: higher than −3° C.

The kinematic viscosity was measured according to JIS K 2283 (2000) and evaluated by the following ratings.

Good: 10 mm$^2$/s (0° C.) or less; Poor: more than 10 mm$^2$/s (0° C.)

[Method for Evaluating Environmental Characteristics]

The biodegradability was measured according to JIS K 6950 (1994) and evaluated by the following ratings.

Good: 50% or more; Slightly Poor: not less than 40% but less than 50%; Poor: less than 40%

The test for acute toxicity to fishes was conducted according to OECD Guide Line, TG 203, and the toxicity was evaluated by the following ratings.

A ricefish was used as the fish to be tested, and the test was conducted in a semi-static procedure.

Twenty five ricefish were put in respective sample concentration regions while controlling the maximum sample concentration in each region so as not to exceed 100 mg/L, thereby calculating $LC_{50}$ after the elapse of an exposure time of 96 h.

Good: $LC_{50}$: 5000 ppm or more; Poor: $LC_{50}$: less than 5000 ppm

Example 2

The same reaction procedure as in Example 1 was repeated except for using a mixture composed of 70% by mass of an α-olefin having 16 carbon atoms and 30% by mass of an α-olefin having 18 carbon atoms, thereby obtaining an internal olefin composition.

The thus obtained internal olefin composition was analyzed and evaluated in the same manner as in Example 1.

Results of the above analysis and experiment are shown in Tables 1, 2 and 3.

Example 3

The same reaction procedure as in Example 1 was repeated except for using a mixture composed of 80% by mass of an α-olefin having 16 carbon atoms and 20% by mass of an α-olefin having 18 carbon atoms, thereby obtaining an internal olefin composition.

The thus obtained internal olefin composition was analyzed and evaluated in the same manner as in Example 1.

Results of the above analysis and experiment are shown in Tables 1, 2 and 3.

Comparative Example 1

The same reaction procedure as in Example 1 was repeated except for using a mixture composed of 90% by mass of an α-olefin having 16 carbon atoms and 10% by mass of an α-olefin having 18 carbon atoms, thereby obtaining an internal olefin composition.

The thus obtained internal olefin composition was analyzed and evaluated in the same manner as in Example 1.

Results of the above analysis and experiment are shown in Tables 1, 2 and 3.

Comparative Example 2

The same reaction procedure as in Example 1 was repeated except for using a mixture composed of 50% by mass of an α-olefin having 16 carbon atoms and 50% by mass of an α-olefin having 18 carbon atoms, thereby obtaining an internal olefin composition.

The thus obtained internal olefin composition was analyzed and evaluated in the same manner as in Example 1.

Results of the above analysis and experiment are shown in Tables 1, 2 and 3.

TABLE 1

| | Composition of raw α-olefins (mass %) $C_{16}/C_{18}$ | Reaction temperature (° C.) Upon initiation | Reaction temperature (° C.) After elapse of 350 h | Residence time (h) | Double bond isomerization rate (mass %) $C_{16}$ | Double bond isomerization rate (mass %) $C_{18}$ |
|---|---|---|---|---|---|---|
| Example 1 | 60/40 | 100 | 160 | 0.5 | 96 | 95 |
| Example 2 | 70/30 | 100 | 160 | 0.5 | 96 | 94 |
| Example 3 | 80/20 | 100 | 160 | 0.5 | 96 | 93 |
| Comparative Example 1 | 90/10 | 100 | 160 | 0.5 | 97 | 93 |
| Comparative Example 2 | 50/50 | 100 | 160 | 0.5 | 95 | 95 |

TABLE 2

|  | Internal olefin composition (mass %) | | Linear chain ratio of internal olefin composition (mass %) | | Contents of components in internal olefin composition (mass %) | | |
| --- | --- | --- | --- | --- | --- | --- | --- |
|  | $C_{16}$ | $C_{18}$ | $C_{16}$ | $C_{18}$ | α-Olefins | Branched olefins | Heavy components |
| Example 1 | 60 | 40 | 95 | 90 | 4.4 | 7.0 | 1.7 |
| Example 2 | 70 | 30 | 95 | 90 | 4.6 | 6.5 | 2.0 |
| Example 3 | 80 | 20 | 94 | 90 | 4.6 | 6.8 | 1.9 |
| Comparative Example 1 | 90 | 10 | 94 | 90 | 3.4 | 6.4 | 2.3 |
| Comparative Example 2 | 50 | 50 | 95 | 89 | 5.0 | 8.0 | 1.8 |

TABLE 3

|  | Fluidity | | Environmental characteristics | | |
| --- | --- | --- | --- | --- | --- |
|  | Pour point (° C.) | Kinematic viscosity (0° C.; mm$^2$/s) | Biodegrad-ability | Acute toxicity to fishes | General evaluation |
| Example 1 | Good | Good | Good | Good | Good |
| Example 2 | Good | Good | Good | Good | Good |
| Example 3 | Good | Good | Good | Good | Good |
| Comparative Example 1 | Good | Good | Good | Poor | Poor |
| Comparative Example 2 | Poor | Poor | Good | Good | Poor |

From the above Tables, it was conformed that the internal olefin compositions obtained in Examples 1 to 3 were identical in biodegradability to those obtained in Comparative Examples 1 and 2, but were more excellent in toxicity to fishes than those obtained in Comparative Examples 1 and 2.

Further, it was confirmed that the internal olefin compositions obtained in Examples 1 to 3 were excellent in both of biodegradability and toxicity to fishes as compared to those obtained in Comparative Examples 1 and 2.

INDUSTRIAL APPLICABILITY

In accordance with the present invention, there can be obtained products containing an internal olefin composition such as high-performance base oils for oil drilling, which are excellent in both of fluidity and environmental characteristics as compared to the conventional products. The thus obtained products are expected to exhibit a less burden to the environments.

The invention claimed is:

1. An internal olefin composition comprising a mixture of 65 to 80% by mass of an olefin having 16 carbon atoms and 35 to 20% by mass of an olefin having 18 carbon atoms, wherein a content of an α-olefin in the mixture is 10% by mass or less, and a content of a branched olefin in the mixture is 10% by mass or less, and wherein a content of hydrocarbons having 20 or more carbon atoms of heavy components in the composition is 3% by mass or less.

2. The internal olefin composition according to claim 1, wherein the composition is produced by isomerizing α-olefins respectively having 16 and 18 carbon atoms in the presence of a zeolite- and/or montmorillonite-based catalyst.

3. A base oil for oil drilling, comprising the internal olefin composition as defined in claim 1.

4. A cutting oil for cutting a submarine base rock, comprising the internal olefin composition as defined in claim 1.

5. The internal olefin composition according to claim 1, wherein the olefin having 16 carbon atoms is present in an amount of 70-80% by mass and the olefin having 18 carbon atoms is present in an amount of 20-30% by mass.

6. The internal olefin composition according to claim 1, wherein the content of the branched olefin is 7.0% by mass or less.

7. The internal olefin composition according to claim 1, wherein the content of the α-olefin is 4.4% by mass or less.

8. The internal olefin composition according to claim 1, having a kinematic viscosity measured according to JISK 2283 (2000) of 10 mm$^2$/s (0° C.) or less.

9. The internal olefin composition according to claim 1, having a pour point of minus 3° C. or lower according to JISK 2269 (1987).

* * * * *